United States Patent
Ante et al.

(10) Patent No.: US 7,000,488 B2
(45) Date of Patent: Feb. 21, 2006

(54) FORCE-SENSING UNIT FOR MEASURING A BELT TENSILE FORCE ACTING ON A SEATBELT LOCK

(75) Inventors: Johannes Ante, Regensburg (DE); Dorin Diaconu, Resita (RO); Leif Reinhold, Regensburg (DE)

(73) Assignee: Siemens Aktiengellschaft, Munich (DE)

( * ) Notice: Subject to any disclaimer, the term of this patent is extended or adjusted under 35 U.S.C. 154(b) by 0 days.

(21) Appl. No.: 10/454,547

(22) Filed: Jun. 5, 2003

(65) Prior Publication Data

US 2004/0036269 A1   Feb. 26, 2004

(30) Foreign Application Priority Data

Jul. 16, 2002   (RO) .......................... A2002-00990

(51) Int. Cl.
*G01L 1/26* (2006.01)
(52) U.S. Cl. .................................... 73/862.391; 73/862
(58) Field of Classification Search ... 73/862–862.391, 73/862.471–862.393, 862.621; 701/45; 180/268; 280/735
See application file for complete search history.

(56) References Cited

U.S. PATENT DOCUMENTS

| | | | |
|---|---|---|---|
| 4,027,905 A * | 6/1977 | Shimogawa et al. | 280/805 |
| 4,257,626 A * | 3/1981 | Adomeit | 280/806 |
| 4,902,039 A * | 2/1990 | Kawai et al. | 280/802 |
| 5,060,977 A | 10/1991 | Saito | |
| 5,332,261 A * | 7/1994 | Siepierski | 280/801.1 |
| 5,419,019 A * | 5/1995 | Ida | 24/421 |
| 5,839,174 A | 11/1998 | Chamings et al. | |
| 6,230,088 B1 | 5/2001 | Husby | |
| 6,301,977 B1 * | 10/2001 | Stojanovski | 73/862.393 |
| 6,400,145 B1 | 6/2002 | Chamings et al. | |
| 6,454,304 B1 * | 9/2002 | Steffens, Jr. | 280/801.1 |
| 6,520,032 B1 * | 2/2003 | Resh et al. | 73/862.472 |
| 6,578,432 B1 * | 6/2003 | Blakesley et al. | 73/826 |
| 6,679,524 B1 | 1/2004 | Greib et al. | |
| 6,729,194 B1 * | 5/2004 | Kaijala et al. | 73/862.69 |
| 6,776,056 B1 * | 8/2004 | Garver et al. | 73/862 |
| 6,843,143 B1 | 1/2005 | Steele et al. | |
| 6,851,503 B1 | 2/2005 | Almarez et al. | |
| 2002/0171234 A1 * | 11/2002 | Stephen et al. | 280/735 |
| 2003/0025256 A1 * | 2/2003 | Roick | 267/142 |
| 2003/0084731 A1 * | 5/2003 | Muraishi | 73/849 |
| 2004/0036269 A1 | 2/2004 | Garver et al. | |
| 2004/0044455 A1 * | 3/2004 | Ante et al. | 701/45 |

FOREIGN PATENT DOCUMENTS

DE   10049528 A1   4/2001

\* cited by examiner

*Primary Examiner*—Max Noori
*Assistant Examiner*—Alandra Ellington
(74) *Attorney, Agent, or Firm*—Morrison & Foerster LLP

(57) ABSTRACT

Force-sensing unit for measuring a belt tensile force acting on a seatbelt lock, including a casing with an opening formed in a front side, and further including a moving anchor which is located in the casing and which protrudes through the opening and which has a stop that restricts the movement of the lug from the casing against an elastic support, and a sensor for registering the position of the moving anchor, whereby the casing can be attached between the seatbelt lock and an anchorage, characterized in that the elastic support is provided by a torsion spring supported on the anchor and on the casing on both sides of the anchor.

13 Claims, 4 Drawing Sheets

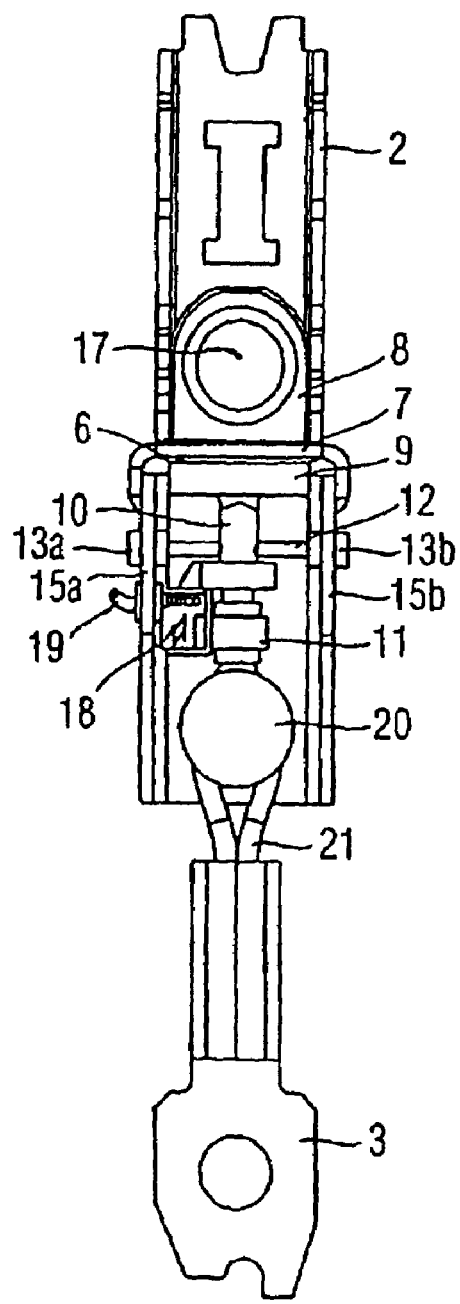
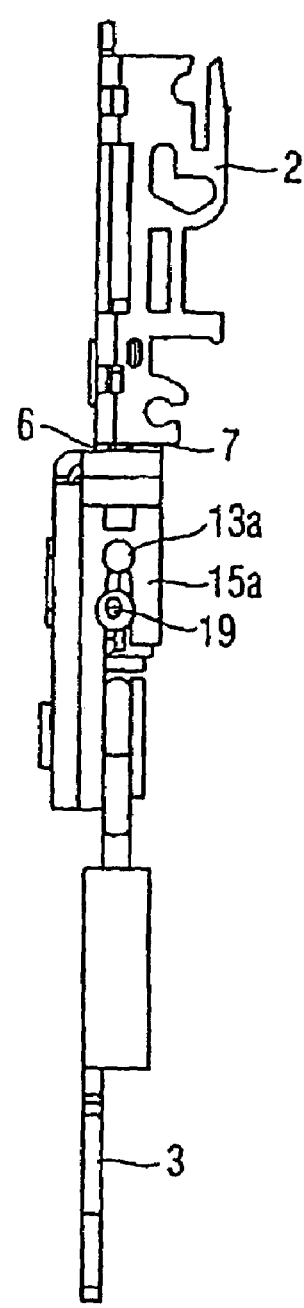
FIG 2A
FIG 2B

FORCE-SENSING UNIT FOR MEASURING A BELT TENSILE FORCE ACTING ON A SEATBELT LOCK

CLAIM FOR PRIORITY

This application claims priority to Romanian Application No. A2002-00990, which was filed on Jul. 16, 2002, which is hereby incorporated by reference.

TECHNICAL FIELD OF THE INVENTION

The invention relates to a force-sensing unit for measuring a belt tensile force acting on a seatbelt lock.

BACKGROUND OF THE INVENTION

To better protect occupants in an automobile it is necessary to measure the belt force of a person wearing a seatbelt. The data is processed and used during an accident to calculate the optimum triggering of belt tensioners and airbags.

The measuring device should therefore measure belt forces in the range 0–150 Newton with an accuracy of approximately +/−2.5%. Belt forces of up to 10,000 N can occur during standard operation. These must not cause damage to the measuring device or seatbelt lock. During an accident the belt force can rise to 20,000 N. The seatbelt lock and measuring device may, in this case, sustain permanent deformation damage but must not fail to operate properly.

A tried-and-tested principle for measuring forces is to measure displacement on a resilient component on which a force has impinged (spiral spring, torsion spring, coil spring, for example). An overload can easily be intercepted here if, after traveling beyond a path or angle specified in the design, the resilient component strikes a mechanical stop (step, edge).

U.S. Pat. No. 6,230,088 B1 discloses a force-sensing unit located between a seatbelt lock and an anchoring point secured to a vehicle's bodywork. However, this already known force-sensing unit for measuring a belt force is complex in its structure and difficult to install.

The invention, on the other hand, provides a simply structured and easily installable force-sensing unit that exhibits a sufficient degree of accuracy in measuring low-level forces.

In one embodiment of the invention, a force-sensing unit is provided which can be produced using standard components and is easy to install. A torsion spring is a simple component which supplies well reproducible values when bent within the elastic area.

In another embodiment of the invention, the torsion spring is formed by two arms advantageously designed to be an integral part of the anchor, can be manufactured economically. Furthermore, it is easy to detect after an accident whether the sensor has an anticipated zero point and consequently does not need replacing, which will save on repair costs. If the zero point has been shifted, meaning that a value exceeding 5 N, for example, is measured without the impact of a force, the force-sensing unit needs to be replaced.

In still another embodiment of the invention, a force-sensing unit is provided which can be easily secured to a seatbelt lock. The force-sensing unit can be manufactured separately and integrated later by the seatbelt lock manufacturer. This thus also makes it possible to subject the sensor to partial (gain and temperature) or complete (offset, gain, temperature) calibration prior to installation on the seatbelt lock or prior to delivery to the seatbelt lock manufacturer, which would simplify the manufacturing process as the seatbelt lock manufacturer will require minimal/no electronic calibration equipment.

Another advantage of the invention lies in the force-sensing unit's being easy to retrofit, with the possibility of securing it by simple means to a conventional seatbelt lock.

The force-sensing unit according to the invention can be used, for example, for optimum triggering of a belt tensioner and/or airbag.

BRIEF DESCRIPTION OF THE DRAWINGS

Exemplary embodiments of the invention are described below with reference to the attached drawings, in which:

FIG. 2a shows a top view onto the force-sensing unit according to FIG. 1.

FIG. 2b shows a lateral view of the force-sensing unit according to FIG. 1.

The same reference numbers are used below for the same components in FIGS. 1 to 4.

DETAILED DESCRIPTION OF THE INVENTION

Figure 1:
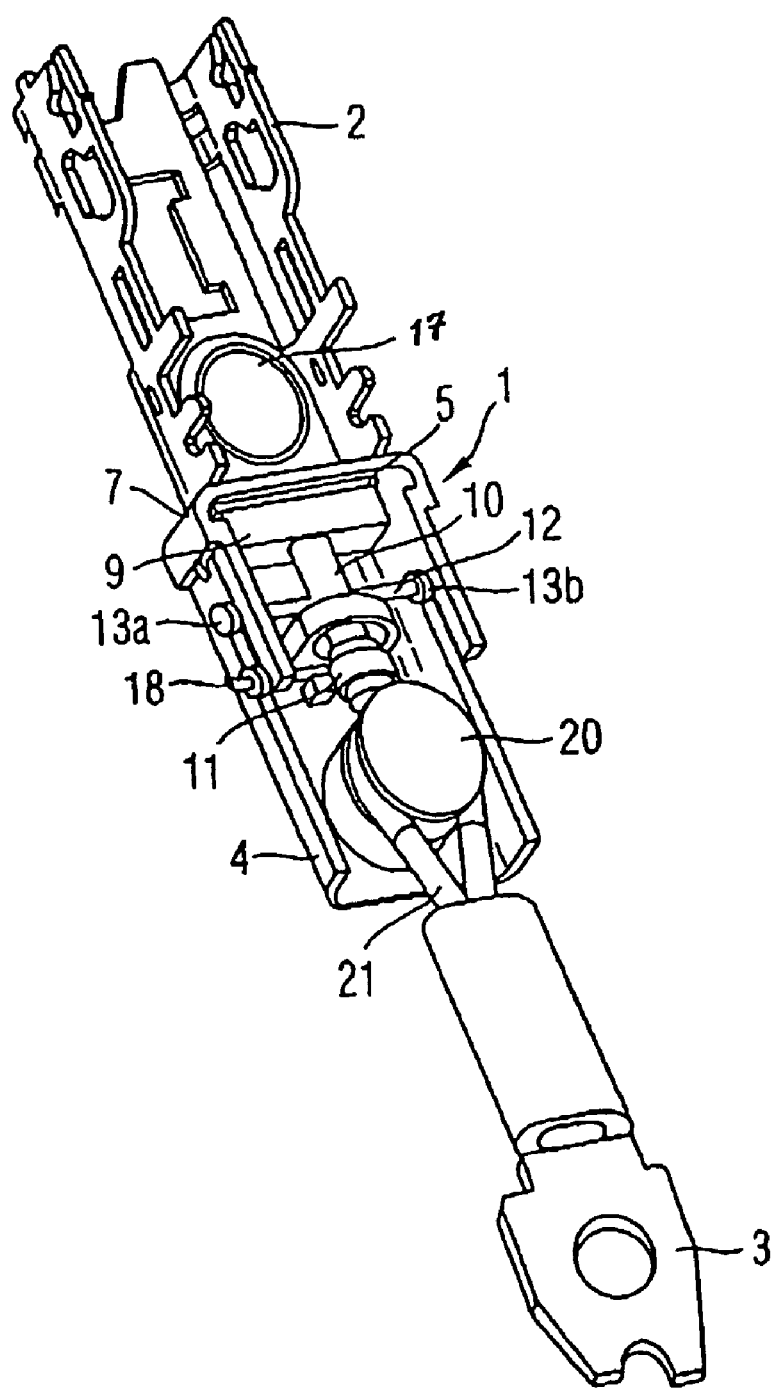
FIG. 1 shows a view of a force-sensing unit according to a preferred exemplary embodiment of the invention in the installed condition and without a case cover.

FIG. 1 shows a force-sensing unit 1 without the case cover that is located between a seatbelt lock 2 of conventional type and an anchorage 3. The anchorage 3 is conventionally connected to, for example, a vehicle's bodywork.

Figure 4:
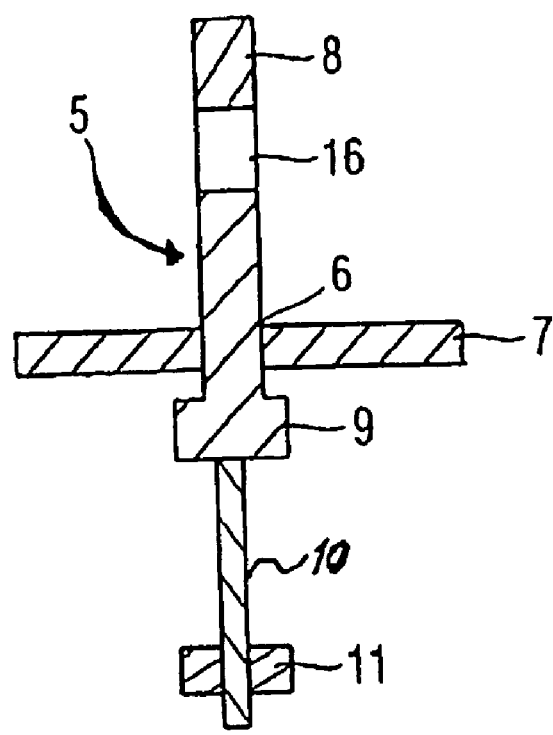
FIG. 4 shows a cross-sectional view of the anchor shown in FIGS. 1 to 3.

Force-sensing unit 1 has a casing 4 in which an anchor 5 is located in such a way as to be mobile. The part of anchor 5 which in the assembled condition faces seatbelt lock 2 is designed as a lug 8 which protrudes through an opening 6 in the front casing wall 7 on the seatbelt lock side of casing 4 and which is designed with a flange-shaped stop 9 that restricts the mobility of anchor 5 from casing 4 in the direction of seatbelt lock 2, as can best be seen in FIG. 4.

Extending from stop 9 to the inside of the casing is a stud 10 on whose end a magnet 11 is located, as can best be seen in FIG. 2a. Elastically bendable arms of a torsion spring 12 extend from stud 10 toward both sides of casing 4. Stop 9, stud 10, and torsion spring 12 are preferably of integral design. Torsion spring 12 can also be designed as a separate component that protrudes through a clearance hole formed in stud 10.

Figure 3:
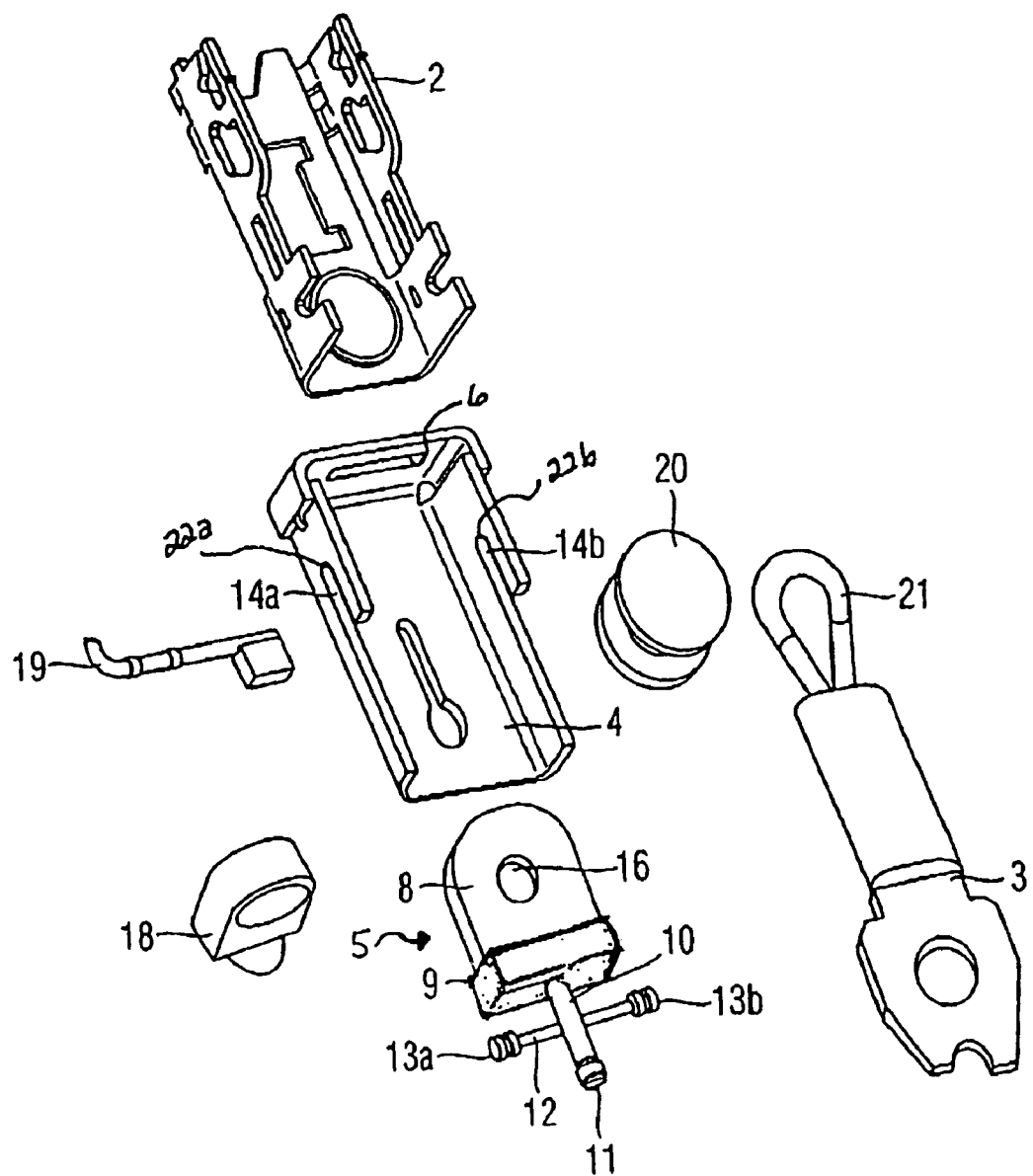
FIG. 3 shows an exploded drawing of the perspective view according to FIG. 1.

Guide rollers 13a and 13b are attached with the ability to rotate to the end areas of torsion spring 12. Alternatively, the guide rollers can be replaced by rigid guide components made of material with a low coefficient of friction or they may be totally absent. Guide rollers 13a and 13b are directed into guides 14a and 14b which are formed in opposite side walls 15a and 15b of casing 4 and which terminate in stop or bearing surfaces 22a, 22b for guide rollers 13a and 13b, as shown in FIGS. 1 to 3. Guides 14a and 14b are preferably designed as slots that are open toward anchorage 3 so that guide rollers 13a and 13b of torsion spring 12 can be easily introduced.

Lug 8 preferably has a hole 16, as can be seen in FIG. 3, for example, so it can be connected to seatbelt lock 2 by means of a rivet 17 when force-sensing unit 1 is in the assembled condition.

As can best be seen in FIG. 2, a sensor (a Hall sensor, for example) 18 is statically located in casing 4 of force-sensing unit 1. Through a change in a magnetic field caused by a movement of magnet 11 formed at the end of stud 10, Hall sensor 18 generates an electrical signal that can be conveyed via an electrical lead 19 to, for example, a control device (not shown) for driving a belt tensioner or airbag.

In its area facing away from front casing wall 7, casing 4 further includes a bolt 20 for securing a loop 21 that is permanently connected to anchorage 3.

To install force-sensing unit 1, first lug 8 of anchor 5 is inserted through opening 6 in front casing wall 7 and guide rollers 13a, 13b are introduced into guides 14a, 14b. The sensor, lead, and case cover are pre-fabricated units and are arranged on force-sensing unit 1. Lug 8 protruding from casing 4 is then secured, for example, to conventional seatbelt lock 2 by being riveted, for instance, or screwed or welded etc. at a location at which anchorage 3 is usually directly secured with seatbelt lock 2 when a force-sensing unit 1 is not used.

The guide rollers 13a, b and stop 9 are preferably dimensioned such that anchor 5 can be moved within a void area that is restricted in one direction by the guide rollers making contact with the bearing surfaces 22a, 22b of guides 14a, 14b, and in the other direction by a stop component, not shown, formed, for example, in at least one of guides 14a, 14b, in order to prevent the magnet 11 from making contact with the sensor 18.

The guide rollers 13a, b and e9-stop 9 are preferably dimensioned such that anchor 5 can be moved within a void area that is restricted in one direction by the guide rollers' making contact with the bearing surfaces 22a, 22b of guides 14a, 14b and in the other direction by a stop component, not shown, formed, for example, in at least one of guides 14a, 14b, in order to prevent the magnet 11 from making contact with the sensor 18.

When a seatbelt is put on and a locking mechanism, whose structure is known per se and which is included in seatbelt lock casing 2, is fastened, a slight belt force takes effect. The effect of this belt force is that the guide rollers of torsion spring 12 will make reliable contact with the bearing surfaces 22a, 22b of guides 14a, 14b. If the belt force is further increased, anchor 5 will be withdrawn from opening 6 with increasing deformation of torsion spring 12 until stop 9 of anchor 5 makes contact with the inside of front wall 7 of casing in order to prevent impermissibly extensive deformation of or damage to torsion spring 12.

It is possible with the force measuring device according to the invention to reliably determine whether a belt has been properly put on (guide rollers stopped against bearing surfaces and no or only slight deformation of the torsion spring). Within the operating range of the force-sensing device (elastic deformation area of the torsion spring) it is possible to accurately measure forces of up to, for instance, around 10,000 N. Forces in excess of this that will occur during a crash are taken up by the stop. The course over time of the build-up of force within the operating range yields information about an imminent crash that can be used to control a belt tensioner or airbag. Damaging of the force-sensing device can therefore be detected from its zero shift (guide rollers making contact with the bearing surfaces without the effect of force).

The invention described in detail above is not restricted to the preferred exemplary embodiment cited, but is simply intended to serve as an example and in no way limits the scope of the invention. For example, an optical sensor can be employed instead of a Hall sensor to determine the position of the anchor. A magnet would not be necessary in this case.

What is claimed is:

1. A force-sensing unit adapted to measure a belt tensile force acting on a seatbelt lock, comprising:
    a casing arranged and configured to be attached between the seatbelt lock and an anchorage, the casing having an opening defined in a front wall thereof and guide slots defined in respective side walls thereof, wherein the anchorage is arranged and configured to be secured to the bodywork of a vehicle;
    an anchor movably disposed within the casing, the anchor comprising a lug protruding through the casing opening;
    a stop extending from the lug and being arranged and configured to restrict movement of the anchor in the direction of the seatbelt lock;
    a stud extending from the stop;
    a torsion spring supported on the stud and having arms extending traversely to the stud, wherein ends of the arms are disposed in respective casing guide slots, the torsion spring being arranged and configured to impart an elastic force on the anchor in a direction opposite of the seatbelt lock when the seatbelt lock is pulled away from the casing; and
    a sensor coupled to the casing and being arranged and configured to detect the position of the movable anchor.

2. The force-sensing unit according to claim 1, wherein each guide slot terminates at a bearing surface, and the torsion spring and the guides are arranged and configured such that the ends of the arms of the torsion spring contact respective bearing surfaces when the seatbelt lock is pulled away from the casing and, when the seatbelt lock is further pulled away from the casing, the arms of the torsion spring elastically deform until the anchor stop contacts the inner surface of the casing front wall.

3. A force-sensing unit adapted to measure a belt tensile force acting on a seatbelt lock, comprising:
    a casing arranged and configured to be attached between the seatbelt lock and an anchorage, the casing having an opening defined in a front wall thereof;
    an anchor movably disposed within the casing and partially protruding from the casing opening;
    a stop arranged and configured to restrict movement of the anchor in a direction of the seatbelt lock;
    a torsion spring arranged and configured to impart an elastic force on the anchor in a direction opposite the seatbelt lock when the seatbelt lock is pulled away from the casing, and having arms extending in opposite directions transverse to the direction of movement of the anchor within the casing; and
    a sensor arranged and configured to detect a position of the movable anchor,
    wherein respective ends of the torsion spring arms are disposed within respective guides defined in side walls of the casing, each guide terminating at a bearing surface, and
    wherein the torsion spring and the guides are arranged and configured such that the ends of the arms of the torsion spring contact the respective bearing surfaces when the seatbelt lock is pulled away from the casing and, when the seatbelt lock is further pulled away from the casing, the arms of the torsion spring elastically deform until the stop prevents the anchor from further moving.

4. The force-sensing unit according to claim 3, wherein the guides are defined as slots having open ends at the side opposite the bearing surface.

5. The force-sensing unit according to claim 4, wherein the torsion spring comprises guide rollers disposed within the respective guides.

6. The force-sensing unit according to claim 5, wherein the torsion spring is integral with the anchor.

7. The force-sensing unit according to claim 6, wherein the anchor comprises a lug arranged and configured to be attached to the seatbelt lock while the lug is protruding through the casing opening and the casing is arranged and configured to be secured to the anchorage via a bolt.

8. The force-sensing unit according to claim 7, wherein the stop is integral with the lug and the anchor further comprises a stud supporting the torsion spring on the stop.

9. The force-sensing unit according to claim 8, further comprising a magnet disposed on the stud, wherein the sensor comprises a Hall sensor arranged and configured to generate electrical signals corresponding to the position of the magnet.

10. The force-sensing unit according to claim 3, wherein the torsion spring is integral with the anchor.

11. The force-sensing unit according to claim 3, wherein a lug is arranged and configured to be attached to the seatbelt lock while the lug is protruding through the casing opening and the casing is arranged and configured to be secured to the anchorage via a bolt.

12. The force-sensing unit according to claim 3, wherein the stop is integral with the anchor, and a stud extends from the stop for supporting the torsion spring, and wherein a lug, the stop and a stud are integrally formed.

13. The force-sensing unit according to claim 3, further comprising a magnet disposed on the anchor, wherein the sensor comprises a Hall sensor arranged and configured to generate electrical signals corresponding to the position of the magnet.

\* \* \* \* \*